(12) United States Patent
Gadelrab et al.

(10) Patent No.: US 12,710,314 B2
(45) Date of Patent: Aug. 18, 2026

(54) DIMENSIONAL FLUID MAPPING SYSTEMS WITH MULTI-FREQUENCY EXCITATION

(71) Applicant: Robert Bosch GmbH, Stuttgart (DE)

(72) Inventors: Karim Gadelrab, Boston, MA (US); Lei Cheng, San Jose, CA (US)

(73) Assignee: Robert Bosch GmbH, Stuttgart (DE)

(*) Notice: Subject to any disclaimer, the term of this patent is extended or adjusted under 35 U.S.C. 154(b) by 635 days.

(21) Appl. No.: 17/499,262

(22) Filed: Oct. 12, 2021

(65) Prior Publication Data

US 2023/0115653 A1 Apr. 13, 2023

(51) Int. Cl.

| | |
|---|---|
| ***G01J 5/00*** | (2022.01) |
| ***H01M 8/04298*** | (2016.01) |
| ***H01M 8/0432*** | (2016.01) |
| ***H01M 8/0438*** | (2016.01) |
| *G01J 5/48* | (2022.01) |
| *H01M 8/10* | (2016.01) |

(52) U.S. Cl.
CPC ....... *G01J 5/0037* (2013.01); *H01M 8/04305* (2013.01); *H01M 8/0432* (2013.01); *H01M 8/0438* (2013.01); *G01J 2005/0077* (2013.01); *G01J 5/48* (2013.01); *H01M 2008/1095* (2013.01)

(58) Field of Classification Search
None
See application file for complete search history.

(56) References Cited

U.S. PATENT DOCUMENTS

2010/0268470 A1* 10/2010 Kamal .................. G01V 11/00 977/953
2015/0323391 A1 11/2015 Mcculloch et al.
(Continued)

FOREIGN PATENT DOCUMENTS

CA 1291552 C 10/1991
JP 2023103665 A 7/2023

OTHER PUBLICATIONS

Engebretsen, E. et al., "Electro-thermal impedance spectroscopy applied to an open-cathode polymer electrolyte fuel cell," Journal of Power Sources, Nov. 11, 2015, vol. 302, pp. 210-214, DOI: 10.1016/j.jpowsour.2015.10.047.

(Continued)

*Primary Examiner* — Erica S Lin
(74) *Attorney, Agent, or Firm* — Brooks Kushman P.C.

(57) ABSTRACT

A dimensional fluid mapping system. An internal fluid device having one or more internal cavities configured to contain a fluid is disclosed. The one or more internal cavities have one or more internal features. The internal fluid device has a first side and a second side opposing the first side. A heating device is configured to apply heat to the first side when driven with a multifrequency excitation signal including first and second frequencies. A thermal measuring device is configured to record thermal signals emitted from the second side. A controller is configured to receive the thermal signals from the thermal measuring device and to generate a dimensional thermal map of one or more internal features of one or more internal cavities and/or an internal fluid distribution of the fluid contained in the one or more internal cavities in response to the thermal signals.

20 Claims, 8 Drawing Sheets

(56) References Cited

U.S. PATENT DOCUMENTS

| | | | |
|---|---|---|---|
| 2022/0338392 | A1 | 10/2022 | Watanabe |
| 2023/0115653 | A1 | 4/2023 | Gadelrab et al. |

OTHER PUBLICATIONS

Rasha, L. et al., "Water distribution mapping in polymer electrolyte fuel cells using lock-in thermography," Journal of Power Sources, Sep. 18, 2019, vol. 440, pp. 1-10, DOI: 10.1016/j.jpowsour.2019.227160.

Robinson, J. B. et al., "Detection of Internal Defects in Lithium-Ion Batteries Using Lock-in Thermography," ECS Electrochemistry Letters, Jul. 15, 2015, vol. 4, No. 9, pp. A106-A109, DOI: 10.1149/2.0071509eel.

Stumper, J. et al., "Diagnostic tools for liquid water in PEM fuel cells," Journal of Power Sources, Jan. 19, 2005, vol. 143, pp. 150-157, DOI:10.1016/j.jpowsour.2004.11.036.

Cardone, G. et al., "Temperature maps measurements on 3D surfaces with infrared thermography," Experimental Fluids, vol. 52, Nov. 24, 2011, pp. 375-385, DOI: 10.1007/s00348-011-1225-9.

Meyer, Q. et al., "The Hydro-electro-thermal Performance of Air-cooled, Open-cathode Polymer Electrolyte Fuel Cells: Combined Localised Current Density, Temperature and Water Mapping," Electrochimica Acta, vol. 180, Aug. 24, 2015, pp. 307-331.

Robinson, J. B. et al., "Thermal Imaging of Electrochemical Power Systems: A Review," Journal of Imaging, vol. 2, No. 2, Jan. 6, 2016, 20 pages, DOI: 10.3390/jimaging2020002.

Du, K. et al., "Multifrequency Induced-Charge Electroosmosis," Micromachines, vol. 10, No. 447, Jul. 3, 2019, pp. 1-25, DOI: 10.3390/mi10070447.

Maraghechi, B. et al., "Temperature Dependence of Harmonics Generated by Nonlinear Ultrasound Beam Propagation in Water: A Simulation Study," 2014 IEEE International Ultrasonics Symposium Proceedings, Oct. 23, 2014, pp. 1456-1459, DOI: 10.1109/ULTSYM.2014.0360.

* cited by examiner

DIMENSIONAL FLUID MAPPING SYSTEMS WITH MULTI-FREQUENCY EXCITATION

TECHNICAL FIELD

The present disclosure relates to dimensional fluid mapping systems with multi-frequency excitation.

BACKGROUND

Water management is often a consideration in internal systems with spatially distributed fluids. Examiners of such internal systems include fuel cells, radiators, and heat exchangers. Diagnostic techniques (e.g., optical inspection and neutron imaging) have been proposed to map water within internal systems.

SUMMARY

According to one embodiment, a dimensional fluid mapping system is disclosed. An internal fluid device having one or more internal cavities configured to contain a fluid is included in the dimensional fluid mapping system. The one or more internal cavities have one or more internal features. The internal fluid device has a first side and a second side opposing the first side. A heating device is configured to apply heat to the first side when driven with a multifrequency excitation signal including first and second frequencies. A thermal measuring device is configured to record thermal signals emitted from the second side. A controller is configured to receive the thermal signals from the thermal measuring device and to generate a dimensional thermal map of one or more internal features of one or more internal cavities and/or an internal fluid distribution of the fluid contained in the one or more internal cavities in response to the thermal signals.

In another embodiment, a dimensional fluid mapping system is disclosed. An internal fluid device having one or more internal cavities configured to contain a fluid is included in the dimensional fluid mapping system. The one or more internal cavities have one or more internal features. The internal fluid device has a first side and a second side opposing the first side. The internal fluid device has first and second depths between the first and second sides. A heating device is configured to apply heat to the first side when driven with a multifrequency excitation signal including first and second frequencies. A thermal measuring device is configured to record thermal signals emitted from the second side. A controller is configured to receive the thermal signals from the thermal measuring device and to generate a dimensional thermal map of one or more internal features of one or more internal cavities and/or an internal fluid distribution of the fluid contained in the one or more internal cavities at the first and second depths of the internal fluid device in response to the thermal signals.

In yet another embodiment, a dimensional fluid mapping system is disclosed. An internal fluid device having one or more internal cavities configured to contain a fluid is included in the dimensional fluid mapping system. The one or more internal cavities have one or more internal features. The internal fluid device has a first side and a second side opposing the first side. A heating device is configured to apply heat to the first side when driven with a multifrequency excitation signal including first and second frequencies. A thermal measuring device is configured to record thermal signals emitted from the second side. A controller is configured to receive the thermal signals from the thermal measuring device, to deconvolute the thermal signals to obtain a multifrequency phase shift thermal map, and to generate a dimensional thermal map of one or more internal features of one or more internal cavities and/or an internal fluid distribution of the fluid contained in the one or more internal cavities in response to the multifrequency phase shift thermal map.

DETAILED DESCRIPTION

Figures 1A, 1B:
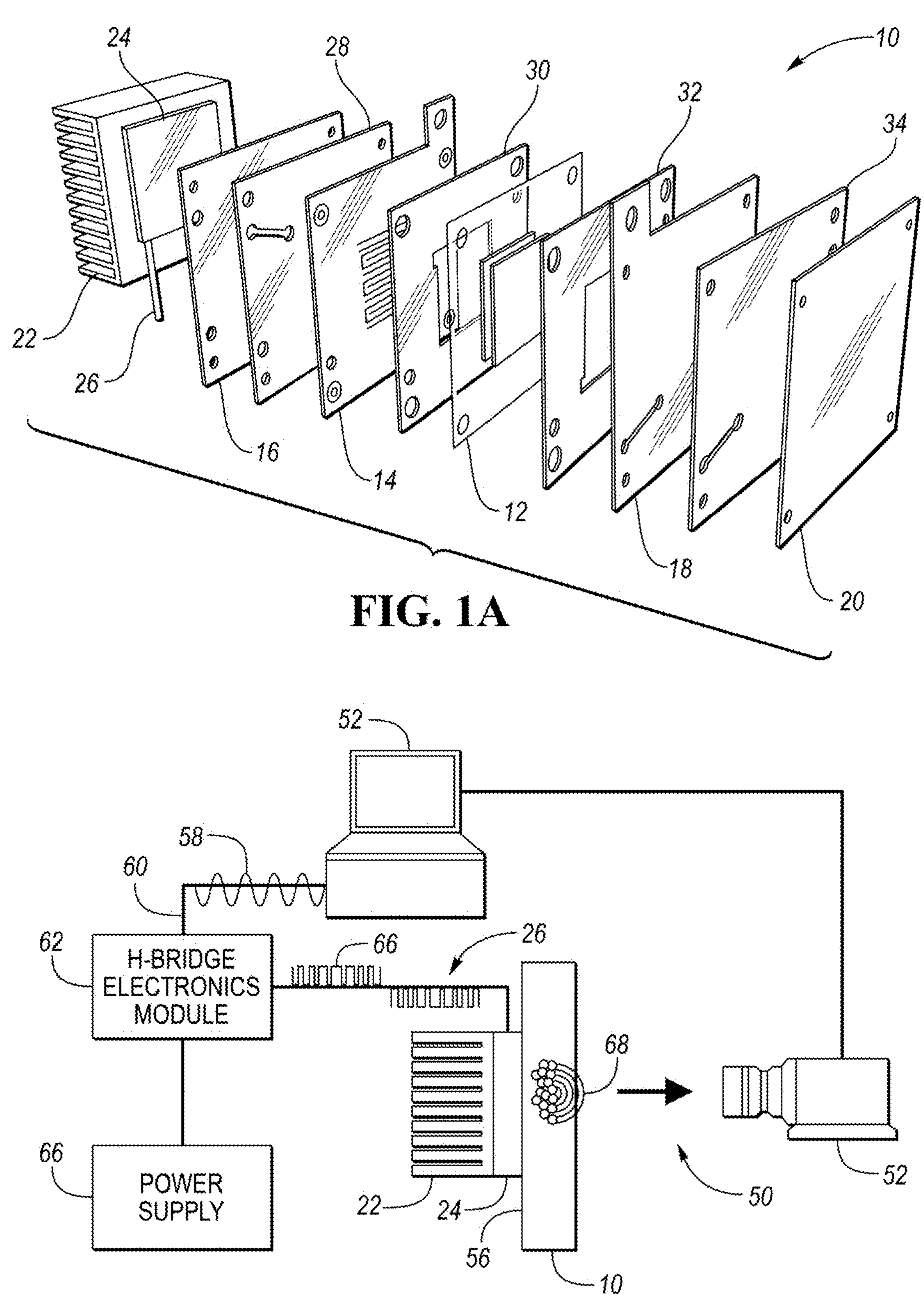
FIG. 1A depicts an exploded view of the components of a printed circuit board fuel cell ("PCB-FC").
FIG. 1B depicts a measurement system configured to record a temperature map of a PCB-FC.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. These terms may be used to modify any numeric value disclosed or claimed herein. Generally, the term "about" denoting a certain value is intended to denote a range within ±5% of the value. As one example, the phrase "about 100" denotes a range of 100±5, i.e., the range from 95 to 105. Generally, when the term "about" is used, it can be expected that similar results or effects according to the invention can be obtained within a range of ±5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1 to 10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Water management of devices having one or more internal cavities configured to contain a fluid is an objective for one or more reasons. A proton exchange membrane fuel cell is an example of a device with internal fluid cavities. Proton exchange membrane fuel cells (PEMFC) supply electricity using hydrogen as a fuel for a broad range of applications including portable, stationary, and transportation applications. Among the challenges for optimizing PEMFC performance is to provide a reliable water management system. Maintaining the PEMFC at a minimum hydration facilitates ionic transport through the membrane of the PEMFC. However, excess liquid water in the PEMFC may deteriorate performance. Performance deterioration may include voltage loss at high current density due to mass transport limitations, voltage instability at low current density, and/or corrosion of the carbon in the catalyst support due to hydrogen starvation and pore blocking due to cathode flooding.

A range of diagnosis techniques have been proposed to enhance water management in PEMFC. A water mapping technique may satisfy one or more criterion (e.g., in situ applicability, minimal invasiveness, and/or ability to provide information on the distribution of liquid water over an active area) to provide useful information regarding PEMFC performance. One approach is to use optical inspection to visualize liquid water in open channels, or by setting transparent windows in a flow field. Neutron imaging is a controllable, high resolution approach that may satisfy all previously mentioned criteria where neutrons are attenuated by hydrogen containing compounds such as water. While its high resolution and success in mapping water inside a PEMFC, neutron imaging has seen limited application due to special equipment necessary to implement neutron imaging. Lab scale mapping techniques would benefit from flow field development and PEMFC performance optimization for PEMFC applications.

Thermography systems are non-invasive and use an infrared camera to product images (e.g., thermograms) that show patterns of heat within a body or device. One non-limiting example of a thermography system is a lock-in thermography system. Lock-in thermography is a non-invasive diagnostic technique that has been utilized in the fields of aeronautical, solar power, and electronics to locate subsurface defects and mechanical failure hotspots within devices. Lock-in thermography measures changes in surface temperature using a thermal imaging camera and an imposed external thermal stimulation. Variations of the lock-in thermography approach have been applied to diagnose characteristics of electrochemical devices, by operating the device in a cycling fashion to induce heat generation and inhomogeneous temperature distribution. A more recent proposal employs a Peltier element configured to apply an external thermal stimulation to a printed circuit board fuel cell ("PCB-FC") and a thermal camera configured to record a PCB-FC response during operation used to characterize an internal structure and water distribution of the PCB-FC.

FIG. 1A depicts an exploded view of the components of PCB-FC 10. PCB-FC 10 includes membrane electrode assembly (MEA) 12, anode flow-field plate 14, anode endplate 16, cathode flow-field plate 18, and cathode endplate 20. Anode and cathode flow-field plates 14 and 18 may be formed of a copper coated plastic material. PCB-FC 10 also includes prepreg layers 28, 30, 32, and 34. Prepreg layer 28 is located between anode flow-field plate 14 and anode endplate 16. Prepreg layer 30 is located between anode flow-field plate 14 and MEA 12. Prepreg layer 32 is located between MEA 12 and cathode flow-field plate 18. Prepreg layer 34 is located between cathode flow-field plate 18 and cathode endplate 20.

Heatsink 22 with Peltier module 24 is located on the side of anode endplate 16 facing away from MEA 12. Conductor 26 (e.g., wire) extends from Peltier module 24. Peltier module 24 is driven with a sinusoidal signal to heat and to cool the side of anode endplate 16 facing away from MEA 12 of PCB-FC 10, causing heat to flow across PCB-FC 10. As heat flows across PCB-FC 10, a thermal camera located adjacent the surface of cathode endplate 20 is configured to record a temperature map as heat flows across PCB-FC 10.

FIG. 1B depicts thermal measurement system 50 configured to record a temperature map of PCB-FC 10. Thermal measurement system 50 includes thermal camera 52, computer 54, heatsink 22, Peltier module 24, and PCB-FC 10. Peltier module 24 and PCB-FC 10 forms thermocouple 56. Computer 54 is configured to drive Peltier module 24 to heat and cool a rear side of PCB-FC 10 with sinusoidal signal 58 to drive a thermal signal across PCB-FC 10 to induce a temperature gradient on the front surface of PCB-FC 10. Computer 54 includes a controller configured to transmit sinusoidal signal 58 through conductor 60. H-bridge electronics module 62 is configured to receive sinusoidal signal 58 and to convert sinusoidal signal 58 into a pulse width modulated ("PWM") signal 64. H-bridge electronics module 62 is configured to transmit PWM signal 64 through conductor 26 to Peltier module 24. H-bridge electronics module 62 is powered by power supply 66. Thermal camera 52 is configured to generate a temperature map from the temperature gradient. Thermal camera 52 may be synced to a driving signal, e.g., PWM signal 64. Thermal measurement system 50 may use a single harmonic.

Figures 2A, 2B, 2C:
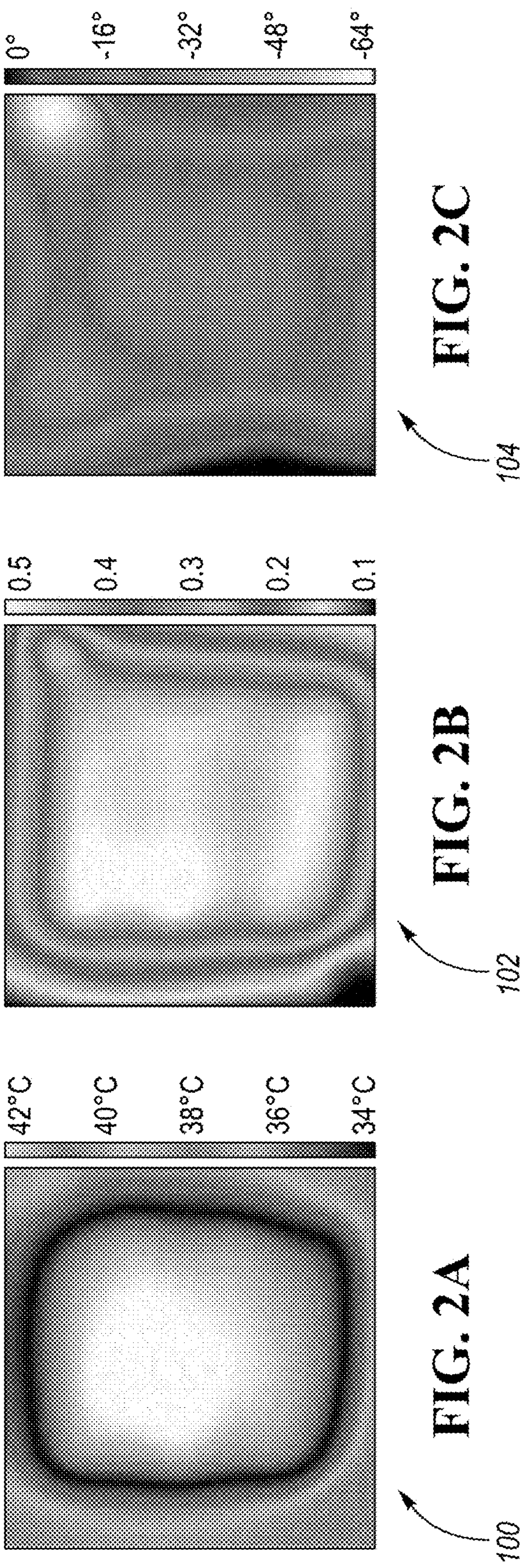
FIGS. 2A, 2B, and 2C depict a thermogram, an ampligram, and a phase shift image, respectively, generated by a thermal measurement system from a PCB-FC humidified at 100 mA/cm$^{-2}$ with a lock-in frequency of 0.07 Hz.

FIGS. 2A, 2B, and 2C show thermogram 100, ampligram 102, and phase shift image 104, respectively, generated by thermal measurement system 50 from PCB-FC 10 humidified at 100 $mA/cm^{-2}$ with a lock-in frequency of 0.07 Hz. While thermogram 100 and ampligram 102 include subtle features to extract relevant information related to presence of water species 68 in PCB-FC 10, phase shift image 104 shows the flow-field and outlet manifold contrasting the surrounding body of PCB-FC 10. The flow channels are discernible from the lands of the flow-field, due to differing thermal conductivities of the internal structure along the heating path. Areas of less thermal resistance are indicated by red or yellow areas in FIGS. 2A, 2B, and 2C. Phase shift image 104 is more tolerant to non-uniform heating and is emissivity independent.

In one or more embodiments, a thermal measurement system is applied to a PEMFC where an MEA is sandwiched between metallic bipolar plates. In one or more embodiments, multifrequency thermal excitation is used to construct three-dimensional (3D) maps of hydration levels in an electromechanical system (e.g., a PEMFC) given the depth dependence of an excitation phase shift. In one or more embodiments, a defined operating frequency range for a metallic bipolar plate is used in the thermal measurement system. In one or more embodiments, lock-in thermography is applied to metallic bipolar plates using transient analysis finite element modeling.

One or more embodiments use lock-in thermography to generate a three-dimensional (3D) map of the internal features and water distribution in electrochemical systems with conductive bipolar plates (e.g., metallic bipolar plates) using one or more external heating elements (e.g., a Peltier module, a resistive filament, or a halogen lamp) to induce thermal stimulation. In one or more embodiments, the one or more external heating elements are driven at a range of frequencies to characterized features at different depths within the electromechanical system. One or more embodiments of the disclosed thermal measurement systems may improve water management in electromechanical systems (e.g., PEMFCs), which may result in improved performance, extended durability, and/or informed design.

Figure 3:
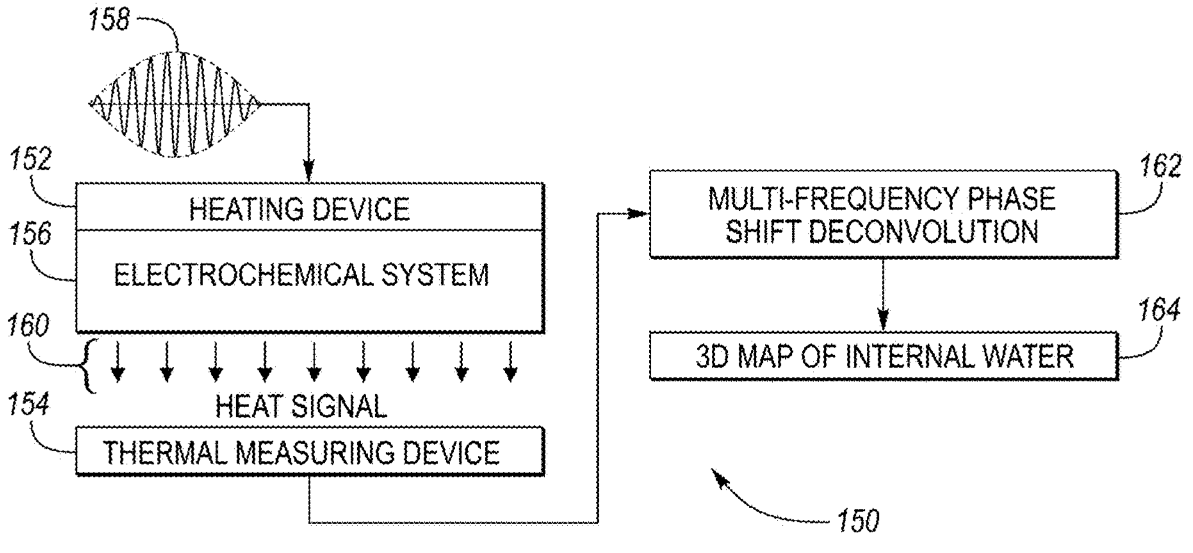
FIG. 3 is a schematic diagram of a thermal measurement system according to an embodiment.

FIG. 3 is a schematic diagram of thermal measurement system 150 according to an embodiment. Thermal measurement system 150 includes heating device 152, thermal measuring device 154, and electromechanical system 156. Non-limiting examples of heating devices include a Peltier module, a resistive filament, and a halogen lamp. Thermal measuring device 154 may be a thermal camera. Electromechanical system 156 may be any electromechanical system 156 with an internal water flow such as a PEMFC. Heating device 152 is driven with multifrequency signal 158 to drive a thermal signal through a first side of electromechanical system 156 through the width of electromechanical system 156, to produce heat signal 160 exiting a second, opposing side of electrochemical system 156. Thermal measuring device 154 is configured to receive heat signal 160 and generate a temperature map in response to receiving heat signal 160. A controller (not shown) is configured to receive the temperature map and perform a multifrequency phase shift deconvolution on the temperature map to obtain multifrequency phase shift deconvoluted temperature map data according to operation 162. The controller may be further configured to generate a three-dimensional (3D) map of internal water in electrochemical system 156 based on the multifrequency phase shift deconvoluted temperature map data. The controller may be included in the thermal measuring device. One or more controllers may be configured to perform the steps identified herein.

Figure 4A:
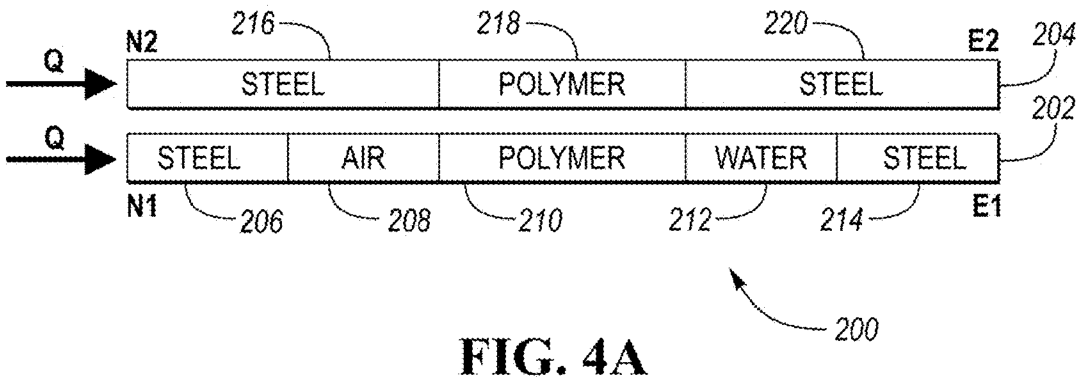
FIG. 4A depicts a one-dimensional (1D) thermal model according to an embodiment.

In one embodiment, a one-dimensional (1D) thermal circuit transient finite element analysis may be applied to demonstrate the applicability of a lock-in thermography technique to an electromechanical system having conductive bipolar plates. FIG. 4A depicts one-dimensional (1D) thermal model 200 according to an embodiment. 1D thermal model 200 includes first and second structures 202 and 204. The size of first and second structures 202 and 204 may be the same. The size of first and second structures 202 and 204 may be about five (5) millimeters. First steel portion 206, air portion 208, polymer portion 210, water portion 212, and second steel portion 214 extend from entry surface N1 to exit surface E1 of first structure 202. First steel portion 216, polymer portion 218, and second steel portion 220 extend from entry surface N1 to exit surface E2 second structure 204. In one embodiment, a 1D thermal circuit transient finite element analysis is applied to first and second structures 202 and 204. The material properties of the materials in first and second structures are set forth below in Table 1.

TABLE 1

| Material | k [W/m · K] | c [J/kg · K] | ρ [kg/m$^3$] |
|---|---|---|---|
| Steel | 79.5 | 466 | 8050 |
| Polymer | 0.03 | 1100 | 830 |
| Air | 0.02 | 1003.5 | 1.2 |
| Water | 0.6 | 4187 | 1000 |

Heat with a sinusoidal amplitude Q enters first and second structures 202 and 204 at N1 and N2, respectively. In the embodiment shown in FIGS. 4A through 4E, the sinusoidal amplitude Q is kW/m$^2$ (0.01 Hz). A convective heat loss h is applied at E1 and E2 of first and second structures 202 and 204, respectively. In the embodiment shown in FIGS. 4A through 4E, the convective heat loss his 12.1 W/m·K.

Figures 4B, 4C:
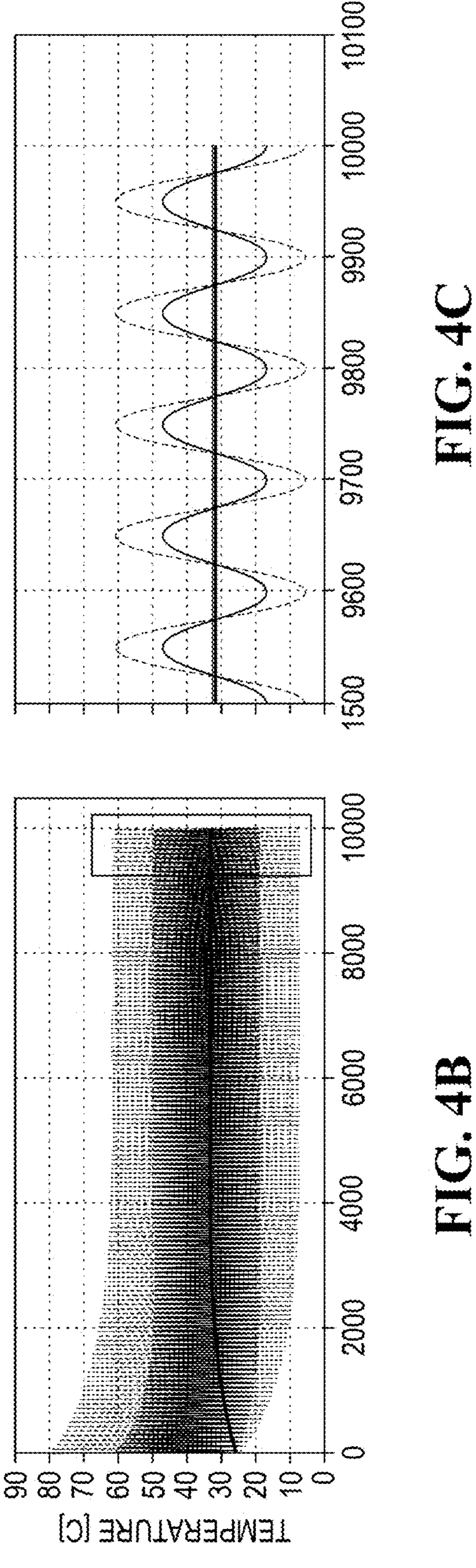
FIG. 4B depicts a graph of temperature [° C.] with a range of 0 to 90° C. as a function of time [seconds] with a range of 0 seconds to 10,000 seconds for N1, N2, E1, and E2 of the 1D thermal model of FIG. 4A.
FIG. 4C depicts a graph of temperature [° C.] with a range of 0 to 90° C. as a function of time [seconds] with a range of 9,500 seconds to 10,000 seconds for N1, N2, E1, and E2 of the 1D thermal model of FIG. 4A.
Figure 4D:
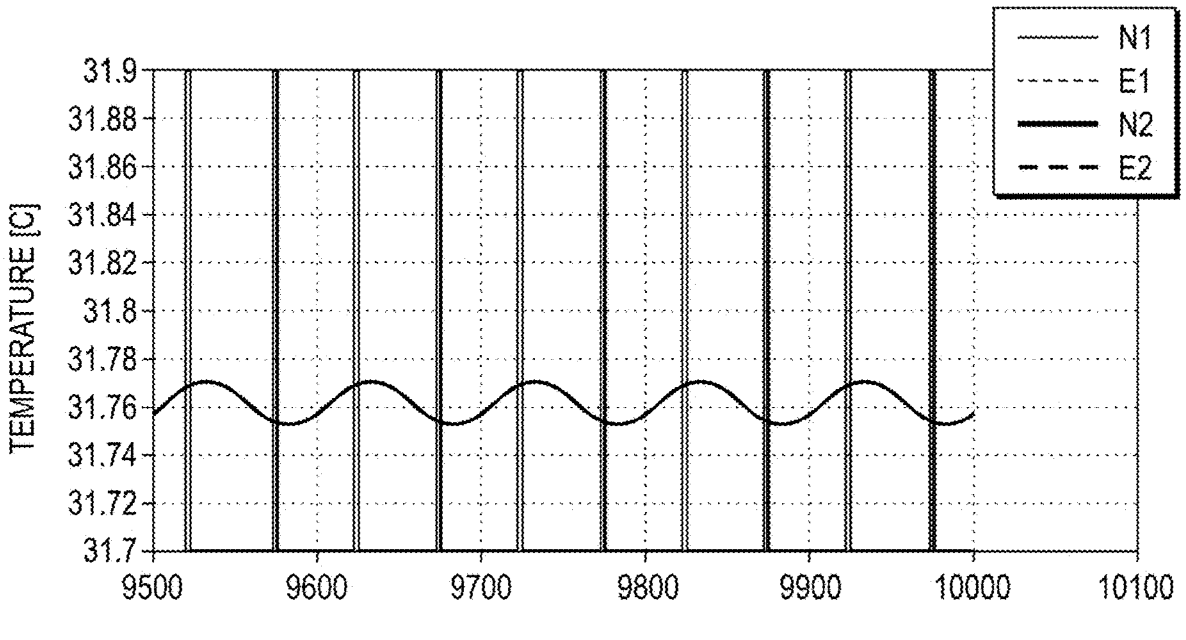
FIG. 4D depicts a graph of temperature [° C.] with a range of 31.7 to 31.9° C. as a function of time [seconds] with a range of 9,500 seconds to 10,000 seconds for N1, N2, E1, and E2 of the 1D thermal model of FIG. 4A.

FIG. 4B depicts a graph of temperature [° C.] with a range of 0 to 90° C. as a function of time [seconds] with a range of 0 seconds to 10,000 seconds for N1, N2, E1, and E2. As shown in FIG. 4B, the cyclic Q causes a large temperature oscillation at the entry surfaces N1 and N2 with a slow transient response that flattens out at about 8,000 seconds. FIG. 4C depicts a graph of temperature [° C.] with a range of 0 to 90° C. as a function of time [seconds] with a range of 9,500 seconds to 10,000 seconds for N1, N2, E1, and E2. FIG. 4D depicts a graph of temperature [° C.] with a range of 31.7 to 31.9° C. as a function of time [seconds] with a range of 9,500 seconds to 10,000 seconds for N1, N2, E1, and E2.

Figure 4E:
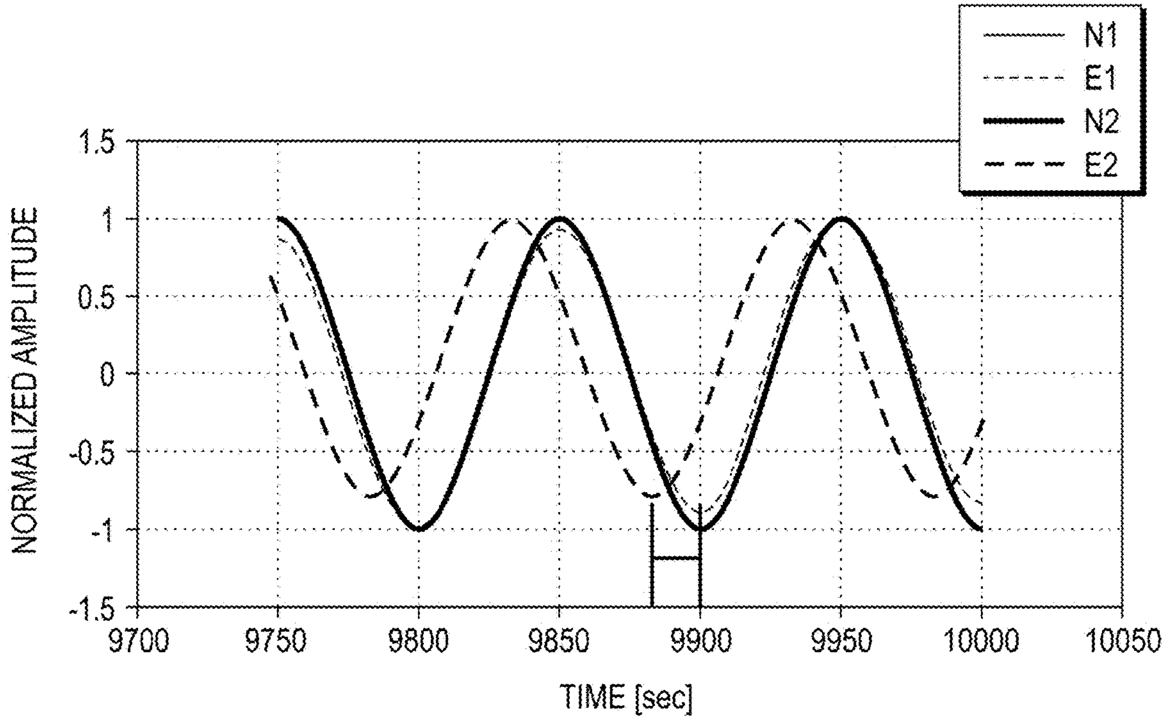
FIG. 4E depicts a normalized amplitude as a function of time [seconds] for N1, N2, E1, and E2 of the 1D thermal model of FIG. 4A.

FIG. 4E depicts a normalized amplitude as a function of time [seconds] for N1, N2, E1, and E2. The measured temperatures at opposite side have amplitudes of about 20 mK, which represent a small signal to detect. However, a substantial phase shift of about 30° is observed between the two paths due to materials properties as shown in the normalized amplitude plot of FIG. 4E as shown by the bar.

The preliminary 1D analysis depicted by FIGS. 4A through 4E demonstrates that a degree of sensitivity is achieved by using a lock-in thermography. This is supported by the capability to detect multiple degrees in phase shift with an algorithm implemented on circuitry.

Figures 5A, 5B, 5C, 5D, 5E:
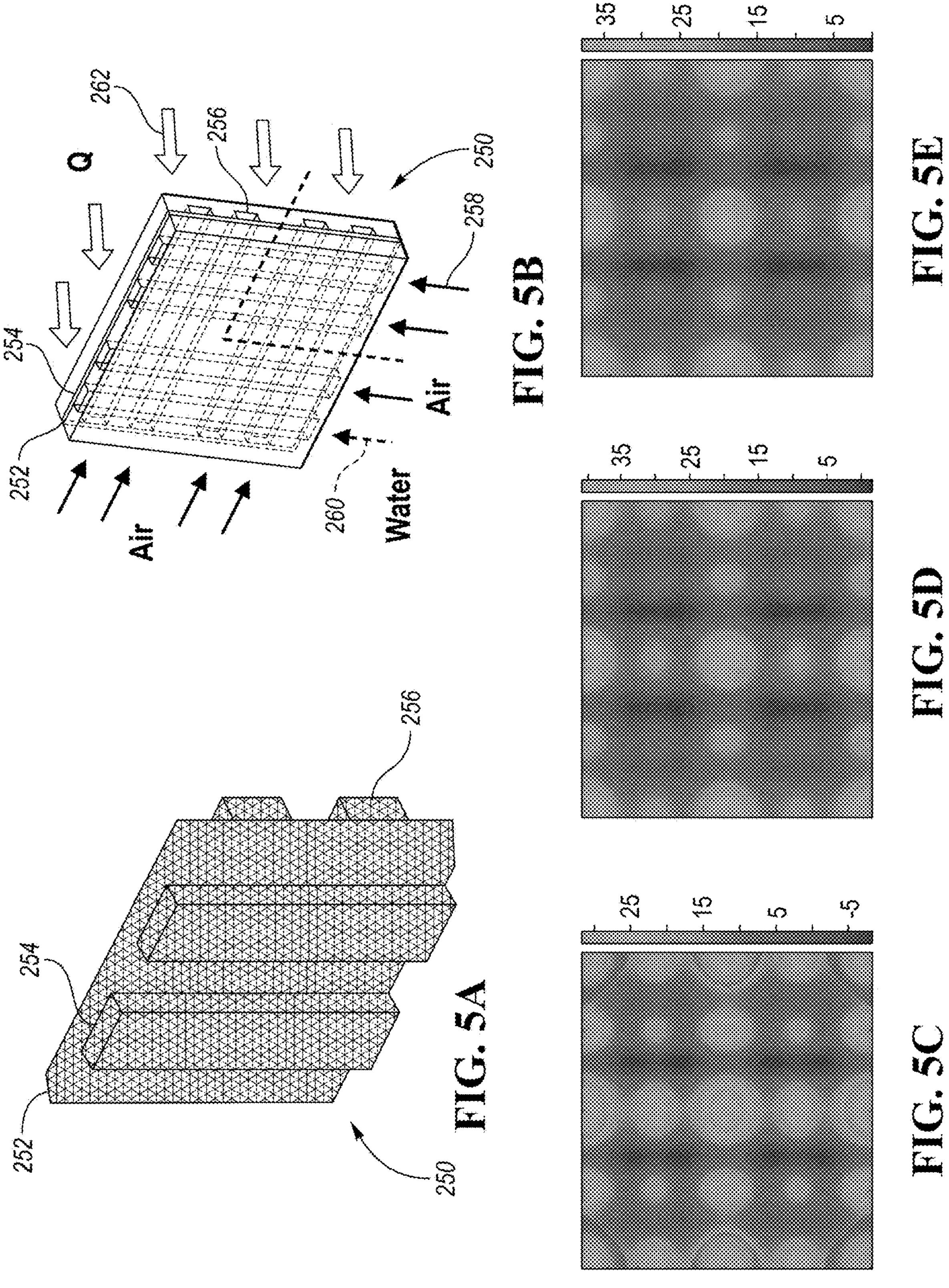
FIGS. 5A and 5B depict schematic, perspective views of a finite element (FE) thermal analysis model including a thin polymer sheet sandwiched between first and second metallic plates.
FIGS. 5C, 5D, and 5E depict surface maps of phase shift in degrees recorded from the face of the first metallic plates of FIGS. 5A and 5B at different excitation frequencies (i.e., 1.4 Hz, 1/6 Hz, and 1/8 Hz, respectively).

In one embodiment, two-dimensional (2D) thermal maps are constructed from three-dimensional (3D) simulations to demonstrate the applicability of lock-in thermography to PEMFCs. FIGS. 5A and 5B depict schematic, perspective views of finite element (FE) thermal analysis model 250 including thin polymer sheet 252 sandwiched between first and second metallic plates 254 and 256. As shown in FIGS. 5A and 5B, FE thermal analysis model 250 is a quarter cell due to symmetry. The bipolar plate elements are not shown in FIG. 5A for purposes of clarity. First and second metallic plates 254 and 256 are patterned with straight channels mimicking bipolar plates flow fields. In one embodiment, the cell size is about 25×25 mm$^2$, with a channel width of 2.5 mm. The medium inside the channels of second metallic plates 256 may be set to have thermal properties of air mimicking hydrogen filled anode. The channels of first metallic plates 254 may be set to have air and water channels to test the contrast that may emerge in case of blockage or formation of air traps. As depicted in FIG. 5B, center channels 258 are set to air thermal properties while outer channels 260 are set to water thermal properties. As shown in FIGS. 5A and 5B, a cross flow is employed to discern the cause of phase contrast in the results. As shown by arrows 262, heat is applied to second metallic plates 256 in a sinusoidal fashion Q causing a harmonic thermal wave to travel across the system. Convective heat loss is applied to all surfaces except the side with second metallic plates 256.

FIGS. 5C, 5D, and 5E depict surface maps of phase shift in degrees recorded from the face of first metallic plates 254 at different excitation frequencies (i.e., 1/4 Hz, 1/6 Hz, and 1/8 Hz, respectively). Throughout the range of frequencies explored, the air channels are discerned where air is shown to have a lower phase shift compared to water. A phase difference of about 10° can be detected between air and water. The results support that faster heat modulation (e.g., high frequency oscillation) tends to improve phase contrast due to the limited time available for in-plane thermal transport. However, excessive oscillation may result in strong transient effects in overall cell temperature which might obscure the phase signal. In one or more embodiments, a reasonable frequency of 1/6 Hz to 1/8 Hz is used to achieve acceptable resolution without strong transient effects. The phase maps of FIGS. 5C, 5D, and 5E further indicate a weak background signal of the anodic flow field, which is evident by the checkerboard pattern of the phase maps, especially at high frequency. In one or more embodiments, lock-in thermography may be applied to PEMFCs to detect an abnormality (e.g., one or more air bubbles or a flow blockage) in a cathode side of a PEMFC.

Figure 6A:
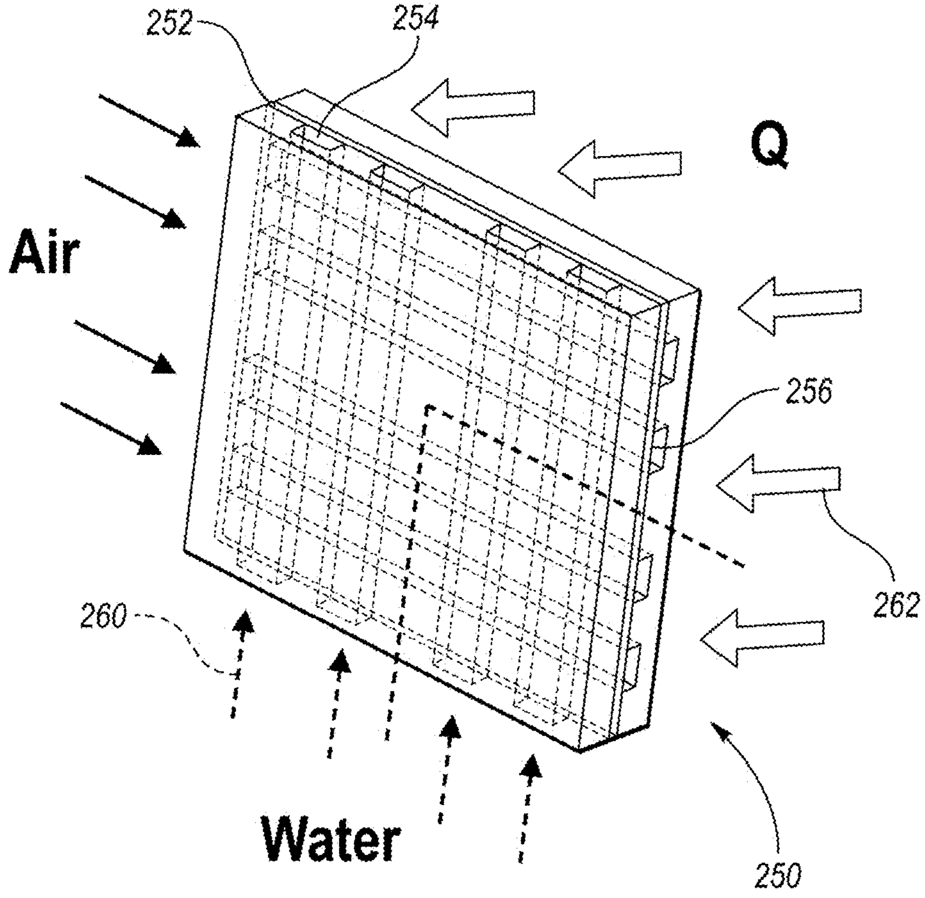
FIG. 6A depicts a schematic, perspective view of a finite element (FE) thermal analysis model including a thin polymer sheet sandwiched between first and second metallic plates with a different setup than FIGS. 5A and 5B.
Figures 6B, 6C, 6D:
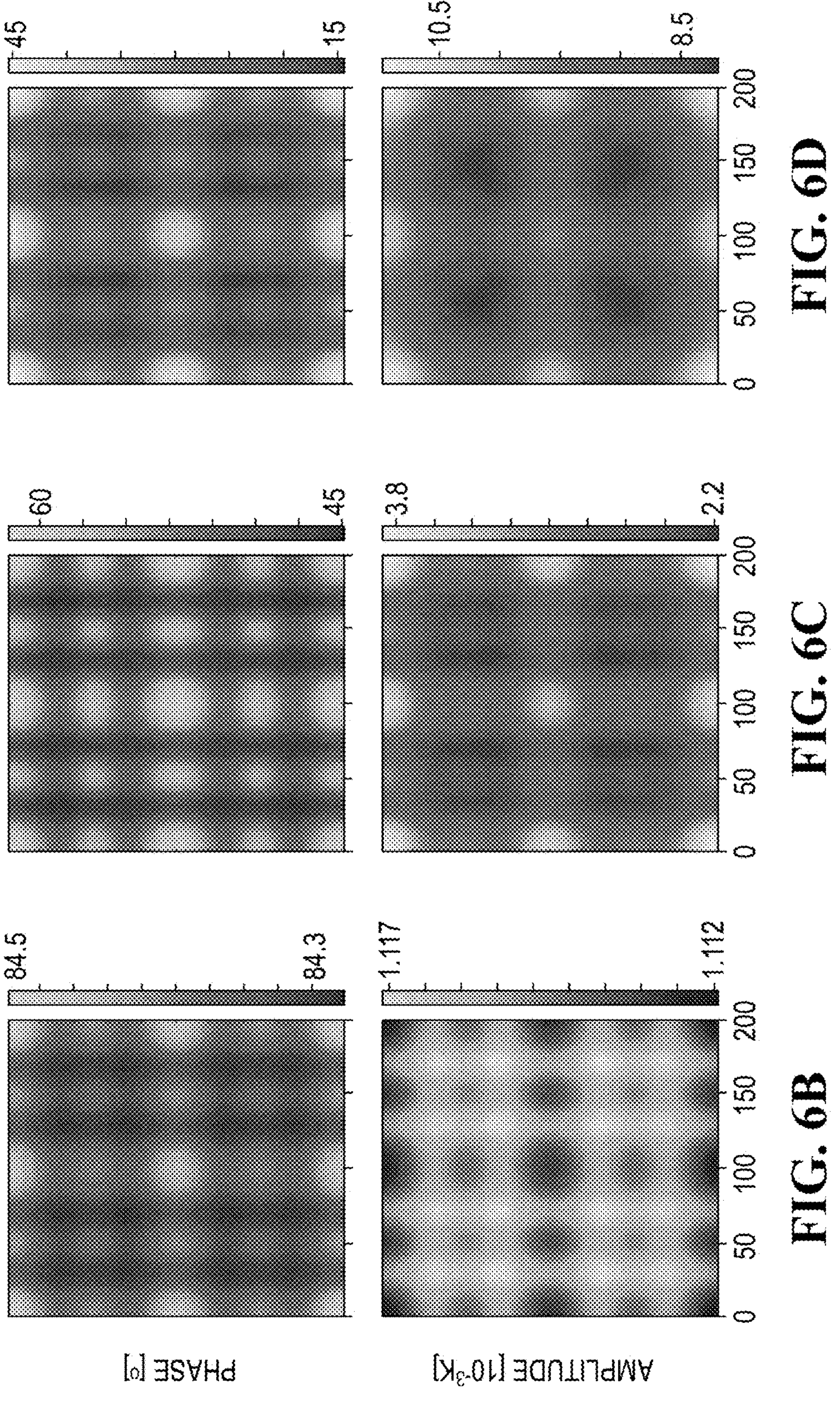
FIGS. 6B, 6C, and 6D depict amplitude and phase maps for different oscillation frequencies (i.e., 1/2 Hz, 1/6 Hz, and 1/10 Hz, respectively) for the 3D FE simulation of an PEMFC shown in FIG. 6A.

The phase maps of FIGS. 5C, 5D, and 5E support the use of different frequency simulation to map features at different depths within a PEMFC. In one embodiment, three-dimensional (3D) finite element (FE) simulations with water flowing in the channels of first metallic plates 254 and only air flowing out of the channels of the second metallic plates, as shown in FIG. 6A. The setup of FIG. 6A is otherwise the same as 5A. FIGS. 6B, 6C, and 6D depict amplitude and phase maps for different oscillation frequencies (i.e., 1/2 Hz, 1/6 Hz, and 1/10 Hz, respectively) for the 3D FE simulation of an PEMFC shown in FIG. 6A. As shown in FIG. 6B, a frequency of excitation of 1/2 Hz causes a low phase contrast of about 0.2° and amplitude contrast of about a μK, which may limit its practicality in one or more applications. In FIG. 6B, a checkerboard pattern is observed in the amplitude map, but with little contrast between air and water phases. Reducing the frequency to 1/6 Hz produces a visible contrast between the channels of first and second metallic plates 254 and 256 in the phase map, while having about a 1.5 mK in amplitude contrast. Moving to slower oscillations (e.g., 1/10 Hz of FIG. 6D) highlights the front channels of first metallic plates 254 with a diffuse back channel pattern of second metallic plate 256. Multiple frequencies (e.g., two or more frequencies) may be used to project an image of anode while temperature is measured at a cathode front surface. As shown in FIG. 6D, the flow channel is indescribable in the amplitude map. The attained results shown in FIGS. 6A to 6D demonstrate that multi-frequency excitation may be employed to probe features at different depth across a PEMFC, resulting in a 3D reconstruction of water distribution.

In one or more embodiments, a general non-destructive, non-invasive systems for in-situ mapping of internal structure change (e.g. accumulation of liquid water in the flow field channel) of systems using external thermal excitation are disclosed. The mapping systems may be applied to internal systems with spatially distributed fluids of different kinds, such as fuel cells, radiators, and heat exchangers. The dimensional fluid mapping systems of one or more embodiments is useful for internal water mapping and blockage detection in piping systems such as radiators and heat exchangers.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The mapping systems of one or more embodiments may be implemented in numerous ways. Various heating elements may be employed to cause the external excitation of the PEMFC. Non-limiting examples of heating elements include a Peltier module, a resistive filament, or a halogen lamp. The multifrequency excitation of one or more embodiments may be achieved by a series of oscillation packets that are applied in a serial fashion back-to-back, or it can be applied using a multi-harmonic excitation where a step function or a Gaussian packet of excitation is directly applied, and the output results are analyzed as a function of the frequency content of the excitation. The first approach permits only a single harmonic at a time to analyze but may take a longer time to run the complete frequency sweep. The latter approach is faster to apply, however, power redistribution between different harmonics would require more sophisticated algorithm to deconvolute the recorded single and construct the frequency dependent phase map.

The dimensional fluid mapping systems of one or more embodiments use a thermal phase shift to detect an internal structural change in response to a thermal signal phase shift. In one or more embodiments, a frequency packet of thermal excitation is used to generate a depth dependent 3D map of water distribution. This may be accomplished in a single run of the system. The dimensional fluid mapping systems of one or more embodiments may be applied to various electrochemical devices such as a water electrolyzer and a $CO_2$ electrochemical conversion device. The dimensional fluid mapping systems of one or more embodiments can be used to locate water packets inside electrochemical devices, thereby providing real-time responses and feedbacks to control systems.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A dimensional fluid mapping system comprising:

an internal fluid device having one or more internal cavities configured to contain a fluid, the one or more internal cavities having one or more internal features, and the internal fluid device having a first side and a second side opposing the first side;

a heating device configured to apply heat to the first side of the internal fluid device when driven with a multi-frequency excitation signal;

a thermal measuring device configured to record thermal signals emitted from the second side of the internal fluid device in response to the multifrequency excitation signal; and a controller configured to receive the thermal signals from the thermal measuring device and to detect an abnormality of the fluid contained in the one or more internal cavities in response to the thermal signals.

2. The dimensional fluid mapping system of claim 1, wherein the controller is further configured to generate a three-dimensional (3D) map of the fluid contained in the one or more internal cavities.

3. The dimensional fluid mapping system of claim 1, wherein the abnormality is one or more air bubbles and/or flow blockages.

4. The dimensional fluid mapping system of claim 1, wherein the heating device is connected to the internal fluid device.

5. The dimensional fluid mapping system of claim 1, wherein the internal fluid device is selected from the group consisting of an electromechanical system, a radiator, and a heat exchanger.

6. The dimensional fluid mapping system of claim 1, wherein the heating device is external to the internal fluid device, and the heating device is selected from the group consisting of a Peltier module, a resistive filament, and a halogen lamp.

7. A dimensional fluid mapping system comprising:

an internal fluid device having one or more internal cavities configured to contain a fluid, the one or more internal cavities having one or more internal features, the internal fluid device having a first side and a second side opposing the first side, and the internal fluid device having first and second depths between the first and second sides;

a heating device configured to apply heat to the first side of the internal fluid device when driven with a multifrequency excitation signal;

a thermal measuring device configured to record thermal signals emitted from the second side of the internal fluid device in response to the multifrequency excitation signal; and a controller configured to receive the thermal signals from the thermal measuring device and to detect an abnormality of the fluid contained in the one or more internal cavities at the first and second depths of the internal fluid device in response to the thermal signals.

8. The dimensional fluid mapping system of claim 7, wherein the first frequency of the multifrequency excitation signal is configured to probe the one or more internal features of one or more internal cavities and/or the internal fluid distribution of the fluid contained in the one or more internal cavities at the first depth, and the second frequency of the multifrequency excitation signal is configured to probe the one or more internal features of one or more internal cavities and/or the internal fluid distribution of the fluid contained in the one or more internal cavities at the second depth.

9. The dimensional fluid mapping system of claim 7, wherein the controller is further configured to generate a three-dimensional (3D) map of the fluid contained in the one or more internal cavities.

10. The dimensional fluid mapping system of claim 7, wherein the internal fluid device is a proton exchange membrane fuel cell (PEMFC) having first and second bipolar plates, and the first and second frequencies of the multifrequency excitation signal are within an operating frequency range of the first and/or second bipolar plates.

11. The dimensional fluid mapping system of claim 10, wherein the first and second bipolar plates are first and second metal bipolar plates.

12. The dimensional fluid mapping system of claim 10, wherein the operating frequency range is ⅙ Hz to ⅛ Hz.

13. The dimensional fluid mapping system of claim 10, wherein the fluid includes water and air.

14. The dimensional fluid mapping system of claim 7, wherein the heating device is external to the internal fluid device, and the heating device is selected from the group consisting of a Peltier module, a resistive filament, and a halogen lamp.

15. A dimensional fluid mapping system comprising:

an internal fluid device having one or more internal cavities configured to contain a fluid, the one or more internal cavities having one or more internal features, and the internal fluid device having a first side and a second side opposing the first side;

a heating device configured to apply heat to the first side of the internal fluid device when driven with a multifrequency excitation signal;

a thermal measuring device configured to record thermal signals emitted from the second side of the internal fluid device in response to the multifrequency excitation signal; and a controller configured to receive the thermal signals from the thermal measuring device, to deconvolute the thermal signals to obtain a multifrequency phase shift thermal map, and to detect an abnormality of the fluid contained in the one or more internal cavities in response to the multifrequency phase shift thermal map.

16. The dimensional fluid mapping system of claim 15, wherein the controller is further configured to generate a three-dimensional (3D) map of the fluid contained in the one or more internal cavities.

17. The dimensional fluid mapping system of claim 15, further comprising a signal generating device configured to generate the multifrequency excitation signal from a series of oscillation packets.

18. The dimensional fluid mapping system of claim 15, further comprising a signal generating device configured to generate the multifrequency excitation signal from a multi-harmonic excitation.

19. The dimensional fluid mapping system of claim 18, wherein the multi-harmonic excitation is a step function or a Gaussian packet of excitation.

20. The dimensional fluid mapping system of claim 15, wherein the internal fluid device is a proton exchange membrane fuel cell (PEMFC) having first and second bipolar plates, and the first and second frequencies of the multifrequency excitation signal are within an operating frequency range of the first and/or second bipolar plates.

* * * * *